United States Patent
Näf

[19]

[11] Patent Number: 6,127,103

[45] Date of Patent: Oct. 3, 2000

[54] PROCESS FOR THE MANUFACTURE OF PHOTOGRAPHIC PICTURES

[75] Inventor: Markus Näf, Zürich, Switzerland

[73] Assignee: Gretag Imaging AG, Regensdorf, Switzerland

[21] Appl. No.: 09/442,808

[22] Filed: Nov. 18, 1999

[30] Foreign Application Priority Data

Nov. 18, 1998 [EP] European Pat. Off. .............. 98121561

[51] Int. Cl.$^7$ .............................. G03C 5/56; G03B 29/00
[52] U.S. Cl. .......................... 430/357; 430/401; 430/403; 355/28; 355/40; 355/54
[58] Field of Search .................................... 430/357, 401, 430/403; 355/28, 40, 54

[56] References Cited

U.S. PATENT DOCUMENTS

| | | | |
|---|---|---|---|
| 4,866,476 | 9/1989 | Kogane et al. | ............................. 355/40 |
| 4,918,483 | 4/1990 | Otake | ......................................... 355/40 |
| 4,959,683 | 9/1990 | Otake et al. | ............................... 355/28 |

FOREIGN PATENT DOCUMENTS

| | | |
|---|---|---|
| 38 09 188 A1 | 9/1988 | Germany . |
| 38 17 138 A1 | 12/1988 | Germany . |
| 38 20 804 A1 | 12/1988 | Germany . |

*Primary Examiner*—Hoa Van Le
*Attorney, Agent, or Firm*—Burns, Doane, Swecker & Mathis, LLP

[57] ABSTRACT

For the manufacture of large format photographic prints, the original image (V) is divided into a matrix arrangement of partial image originals ($A_1$–$D_4$) consisting of lines (1–4) and columns (A–D) with lateral edges (R) which are parallel to the columns of the matrix arrangement. A linear arrangement of sequential latent partial pictures is produced from the individual partial image originals by way of a printer and by sequential projection, whereby the projection is carried out in such a way that the lateral edges (R) of the latent partial pictures which correspond to the lateral edges of the latent partial image originals extend parallel to the longitudinal direction (L) of the linear arrangement of the latent partial pictures. The exposed copy material (P) is developed in a pass-through developing arrangement, whereby a partial image copy is produced from each partial image original and the partial image copies are assembled to a complete compound picture (K). To avoid color and/or density jumps in the region of the separation lines between the individual partial image copies, those partial image copies ($B_1$–$B_4$, $D_1$–$D_4$) which correspond to the partial image originals ($B_1$–$B_4$, $D_1$–$D_4$) in each second column (B,D) of the matrix arrangement, are respectively guided through the pass-through developing arrangement and rotated in their proper plane by 180°, relative to the latent partial images which correspond to the partial image originals in the other columns of the matrix arrangement.

6 Claims, 1 Drawing Sheet

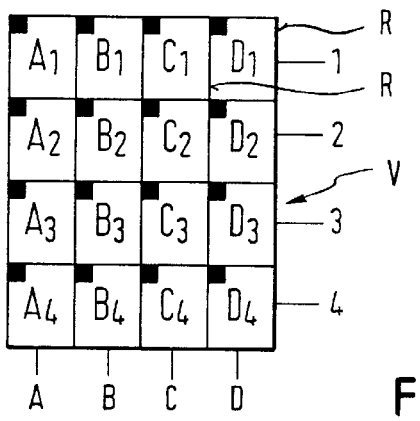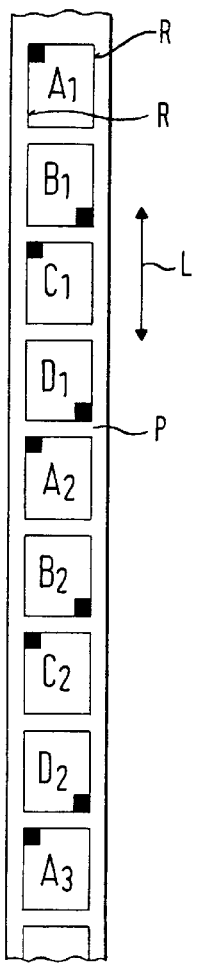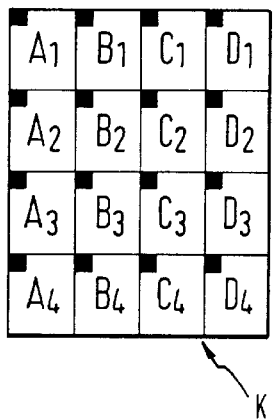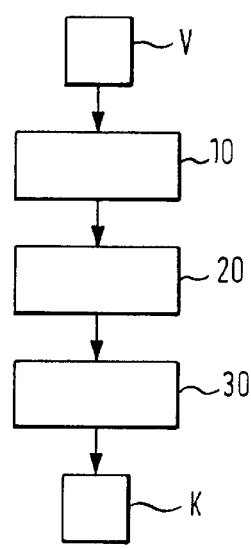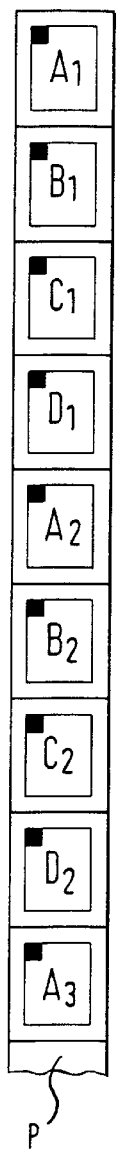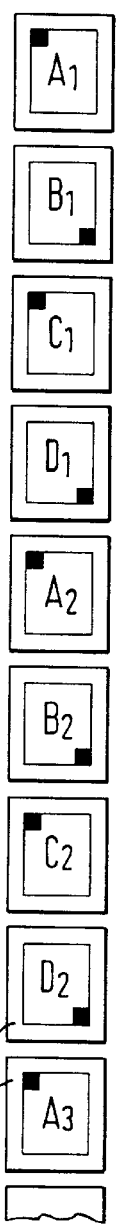

PROCESS FOR THE MANUFACTURE OF PHOTOGRAPHIC PICTURES

This application claims priority under 35 U.S.C. §§119 and/or 365 to 98121561.9 filed in EUROPE on Nov. 18, 1998; the entire content of which is hereby incorporated by reference.

FIELD OF THE INVENTION

The invention relates to a process for the manufacture of photographic pictures by a photographic printer.

BACKGROUND ART

Photographic projection arrangements utilizing a printer normally work with copy material of standardized width, which limits the maximum size of the copies which can be produced. Oversized copies, for example, posters and the like, are produced by assembly from smaller partial pictures. The original images are therefor divided into a number of partial image originals of suitable size, and a set of partial image copies is produced from these partial image originals by sequential projection onto the normally band shaped copy material and by subsequent developing of the copy material in a pass-through developing arrangement. They are then cut to size and assembled to the desired compound picture.

The division of the image original is normally carried out according to a matrix schematic with lines and columns. The lines of the matrix-type arrangement extend parallel to the respective upper and lower edges of the individual partial image originals, the columns extend parallel to the lateral edges of the partial image originals. The individual partial image originals are exposed in the same orientation in a linear arrangement one after the other onto the normally band shaped copy material. The projection of the individual partial image originals is thereby carried out such that the lateral edges of the partial image originals are parallel to the longitudinal edges of the copy material defining the width thereof or in the extreme case coincide therewith. The longitudinal edges of the copy material extend parallel to the transport direction of the copy material through the printer and the pass-through developing arrangement. This definition applies accordingly in the case of sheet material.

Often undesirable or even un-tolerable color and/or density differences occur in pictures manufactured in this manner and composed of individual partial images in the region of the separation lines between the individual columns of the picture, which are caused by the practically unavoidable inhomogeneities of the pass-through developing arrangement transverse to the transport direction. While these inhomogeneities are practically unimportant in the normal case, i.e. during the manufacture of individual photographic copies of common format, they however are of greatly negative influence during the manufacture of composite pictures.

SUMMARY OF THE INVENTION

This difficulty is now to be overcome by the present invention and a process of the generic type improved in such a way that color and/or density differences in the separation regions between the individual partial images of the total image are avoided.

According to the basic idea of the invention, the latent partial images produced from the partial images of each second column of the image original are guided through the developing arrangement in a reversed orientation, thus rotated in their proper plane by 180°. In this manner, the lateral edges of the partial images which later are adjacent in the assembled composite picture respectively pass through the same transport path of the developing arrangement and are consequently developed equally.

The rotation of the latent partial images can in principle be realized in two ways. First, the sections of the copy material carrying the respective latent partial images can be physically rotated in their plane by 180°, and otherwise, according to an especially preferred embodiment of the invention, the projection of the respective partial image originals can be carried out rotated by 180°. The latter is especially then very practical when the image original is present in electronic format and the projection is carried out digitally. The rotation of the partial image originals can thereby be easily realized by way of the software. Suitable digital printers are know and therefore need not be further discussed.

BRIEF DESCRIPTION OF THE DRAWINGS

The invention will be further described in the following by way of the drawing. It show:

FIG. 1 a schematic illustration of an image original to be copied;

FIG. 2 a section of a copy material band with latent partial images exposed thereon to in accordance with the invention;

FIG. 3 a section of a copy material band with latent partial images conventionally exposed thereon to;

FIG. 4 a sequence of copy material sections arranged in accordance with the invention with latent partial images exposed thereon to;

FIG. 5 a schematic illustration of a finished compound picture; and

FIG. 6 a schematic illustration of the individual steps of the process in accordance with the invention.

DETAILED DESCRIPTION OF THE PREFERRED EMBODIMENT

As is apparent from the overview illustration of FIG. 6, the process in accordance with the invention includes essentially three steps: an original image (V), preferably in electronic format, is divided in a digital projection arrangement (printer) 10 into a matrix type arrangement of smaller partial image originals, and these partial image originals are sequentially projected in the printer onto a band of photographic copy material. The exposed copy material with the partial images thereon is fed to a pass-through developing arrangement 20 and treated therein by conventional wet chemistry. The developed material is then guided to an assembly stage 30 wherein the individual partial image copies are appropriately cut and assembled to the finished compound picture K.

Up to this point, the process corresponds to the prior art and therefore needs not be discussed further. The differences in accordance with the invention reside in the orientation of the latent partial pictures during their passage through developing arrangement and are described in the following in detail by reference to FIGS. 1 to 5.

FIG. 1 shows an exemplary image original V which is divided into a matrix type arrangement of partial image originals. The matrix arrangement includes in this example four rows 1–4 and four columns A–D. The individual partial image originals are designated $A_1$, $B_1$, $C_1$, ..., $C_4$, $D_4$. Each partial image original is delimited by an upper edge and a lower edge as well as two lateral edges R. The lateral edges R extend parallel to the columns A–D, the upper and lower edges lie parallel to the rows 1–4.

Of course, a smaller or larger number of rows and columns is possible depending on the size of the image original and the enlargement scale. In the lower extreme case, the image original includes only two partial image originals in the form of a 1×2 matrix, which means only a single row with two columns.

In the printer 10, the individual partial image originals are sequentially exposed row by row onto the copy material band P and in a linear arrangement in longitudinal or transport direction of the latter. The orientation is thereby selected such that the lateral edges R of the partial images projected thereonto or of the latent partial pictures produced on the copy material by the projection are positioned parallel to the longitudinal or transport direction L of the copy material P. A typical projection sequence is illustrated in FIG. 2, whereby the latent partial pictures are provided with the same reference characters as their corresponding partial image originals.

In order to prevent the color and/or density jumps caused by the inhomogeneity effects of the downstream developing arrangement, the partial image originals of each second column are exposed reversed onto the copy material, which means rotated in their proper plane by 180° relative to the other partial image originals. In the illustrated example those are the partial image originals $B_1$–$B_4$, and $D_1$–$D_4$. The corresponding latent partial pictures therefore appear upside down relative to the other latent partial pictures.

The copy material band P exposed in such a way is now guided in longitudinal direction L to the pass-through developing arrangement 20 and there developed in the conventional manner. Subsequently, the partial image copies produced in this manner are cut in the assembly stage 30 and assembled in the correct orientation to the finished compound picture K (FIG. 3). For greater simplicity, the individual partial image copies of the compound picture K are provided in FIG. 5 with the same reference characters as the corresponding partial image originals of the original image V.

FIGS. 3 and 4 show an alternative embodiment of the process in accordance with the invention. All partial image originals are hereby sequentially exposed onto the photographic copy material in the same orientation (FIG. 3). However, the copy material band is subsequently divided into sections S which respectively include a latent partial image. Those copy material sections which include partial images which correspond to the partial image originals of the respective second columns of the matrix arrangement are then rotated by 180° (FIG. 4). The individual copy material sections are then guided in the illustrated sequence and orientation into the developing arrangement, which in this variant of course must be equipped to handle sheet material.

It is understood that one can operate with sheet type copy material in both variants of the process in accordance with the invention. It is further also principally possible to carry out the projection of the partial image originals not in rows, as described above, but in columns. However, because of the danger of longitudinal inhomogeneities of the pass-through developing arrangement, the projection by row is preferred.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for manufacturing photographic pictures from an image original, the method comprising the steps of:

dividing said original in a digital projection arrangement into a matrix arrangement consisting of rows and columns of partial image originals with lateral edges of said partial image originals being parallel to the columns of the matrix arrangement;

producing a linear arrangement of sequential latent partial pictures from the individual partial image originals on a copy material by a printer using sequential projection, said projection resulting in lateral edges of the latent partial pictures corresponding to the lateral edges of the partial image originals extending parallel to a longitudinal direction of the linear arrangement of the latent partial pictures; and developing an exposed copy material in a pass-through developing arrangement wherein a partial picture copy is generated from each partial image original and the partial image copies are assembled to a compound picture, wherein latent partial images corresponding to the partial image originals in each of a plurality of alternating columns of the matrix arrangement are guided through the pass-through developing arrangement rotated by 180°.

2. A method according to claim 1, wherein the partial image originals in each of said plurality of alternating columns of the matrix arrangement are projected onto the copy material rotated by 180° relative to the partial image originals in columns of the matrix arrangement that are intermediate said alternating columns.

3. A method according to claim 1, wherein the projection is effected onto a band shaped copy material.

4. A method according to claim 1, wherein sections of the photographic copy material containing latent partial pictures corresponding to the partial image originals in each of said plurality of alternating columns of the matrix arrangement are fed into the pass-through developing arrangement rotated by 180° relative to sections containing latent partial pictures corresponding to the partial image originals in columns of the matrix arrangement that are intermediate said alternating columns.

5. A method according to claim 4, wherein the projection is effected onto a band shaped copy material.

6. A method according to claim 1, wherein an electronically present image original is used and the projection is carried out digitally.

* * * * *